United States Patent [19]
Nian

[11] Patent Number: 5,901,385
[45] Date of Patent: May 11, 1999

[54] DRY TYPE TOILET SYSTEM

[76] Inventor: Chin Fu Nian, No. 24 Minchou Street, Yuli, Hualian Hsien, Taiwan

[21] Appl. No.: 08/991,596

[22] Filed: Dec. 16, 1997

[51] Int. Cl.$^6$ .............................. A47K 11/06; A47K 11/02
[52] U.S. Cl. .......................... 4/484; 4/449; 4/471; 4/479; 4/315; 4/DIG. 19; 210/532.1; 210/532.2
[58] Field of Search ............................... 4/449, 471, 479, 4/483, 484, 315, DIG. 19; 210/532.1, 532.2

[56] References Cited

U.S. PATENT DOCUMENTS

| | | | |
|---|---|---|---|
| 3,693,193 | 9/1972 | May ............................................. | 4/484 |
| 4,254,515 | 3/1981 | Kiyama et al. ...................... | 4/DIG. 19 |
| 5,161,263 | 11/1992 | Geneve et al. ............................... | 4/483 |
| 5,193,231 | 3/1993 | Stender ....................................... | 4/484 |

*Primary Examiner*—David J. Walczak
*Assistant Examiner*—Tuan N. Nguyen
*Attorney, Agent, or Firm*—Bacon & Thomas

[57] ABSTRACT

A dry type toilet system which includes a toilet bowl, the toilet bowl having a hinged clamping ring adapted for clamping on a rim thereof to hold a poly bag therein in an open status for collecting waste matter discharged from a person sitting on the toilet bowl, permitting used poly bag with collected waste matter to fall out of the toilet bowl through a bottom passage way in the toilet bowl, a crushing and separating unit controlled to crush waste poly bag with collected waste matter and to separate wastewater from solid waste matter, a filter tank adapted to filter waste water delivered from the crushing and separating unit, and a storage unit adapted to collect and dry solid waste matter delivered from the crushing and separating unit.

6 Claims, 6 Drawing Sheets

DRY TYPE TOILET SYSTEM

BACKGROUND OF THE INVENTION

The present invention relates to toilet systems for collecting and treating waste matter discharged from the users, and more particularly to a dry type toilet system which does not use water to flush waste matter away.

Regular toilet systems commonly use running water to flush waste matter away from the toilet bowl. These toilet systems consume a big amount of water daily, and must be used with a cesspool, so that discharged wastes can be collected and well treated. If waste matter discharged from a toilet system is directly guided to a river, the river will be contaminated.

SUMMARY OF THE INVENTION

It is one object of the present invention to provide a dry type toilet system which keeps the toilet bowl clean without using water. It is another object of the present invention to provide a dry type toilet system which collects discharged waste matter, processes solid waste matter into organic fertilizer, and filters discharged waste water before draining.

According to one aspect of the present invention, the dry type toilet system comprises a toilet bowl, the toilet bowl having a hinged clamping ring adapted for clamping on a rim thereof to hold a poly bag therein in an open status for collecting waste matter discharged from a person sitting on the toilet bowl, permitting used poly bag with collected waste matter to fall out of the toilet bowl through a bottom passage way in the toilet bowl. According to another aspect of the present invention, the dry type toilet system further comprises a crushing and separating unit controlled to crush waste poly bag with collected waste matter and to separate waste water from solid waste matter, a filter tank adapted to filter waste water delivered from the crushing and separating unit, and a storage unit adapted to collect and dry solid waste matter delivered from the crushing and separating unit.

DETAILED DESCRIPTION OF THE PREFERRED EMBODIMENT

Figure 1:
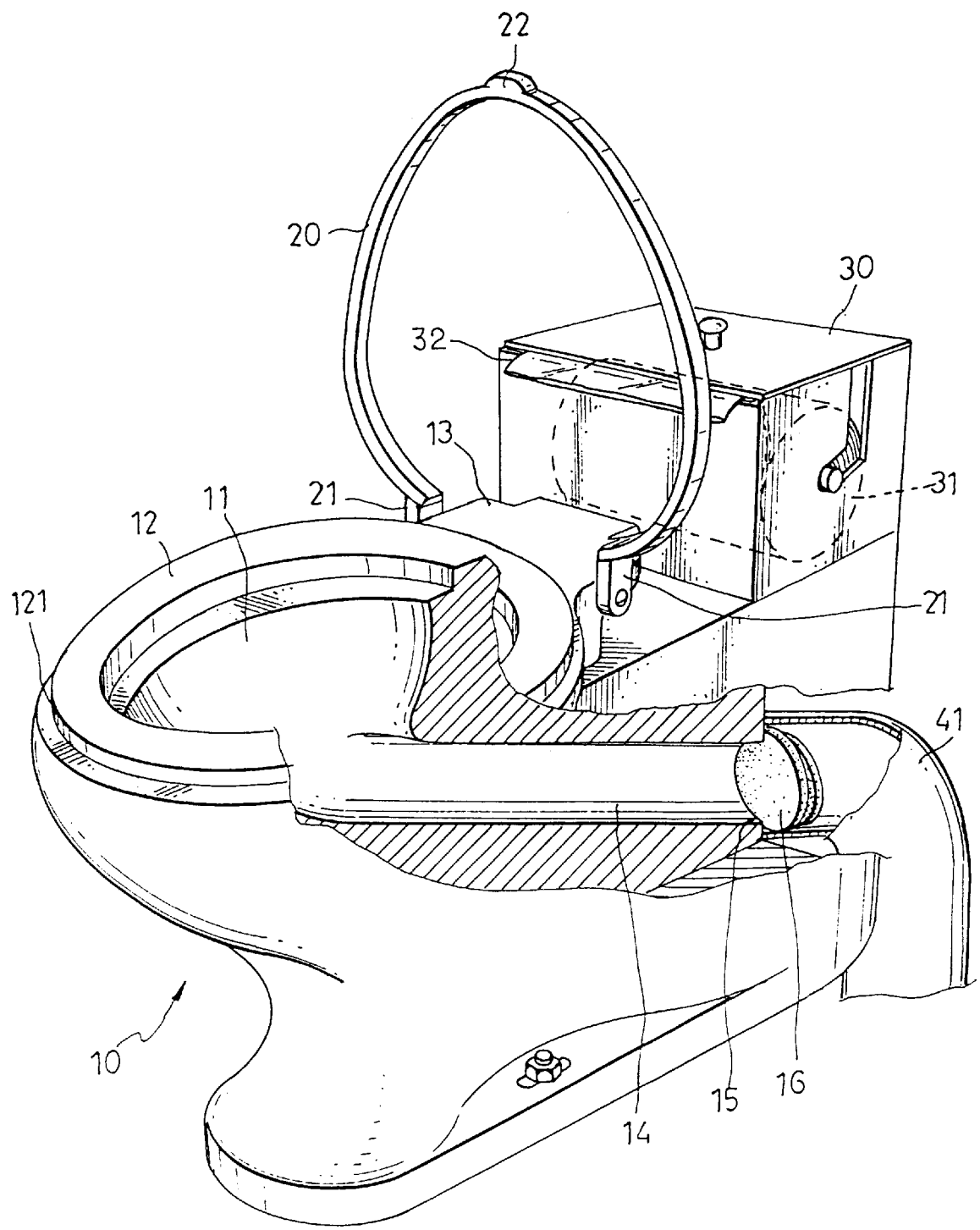
FIG. 1 is a perspective view of a toilet bowl for a dry type toilet system according to the present invention.
Figure 2:
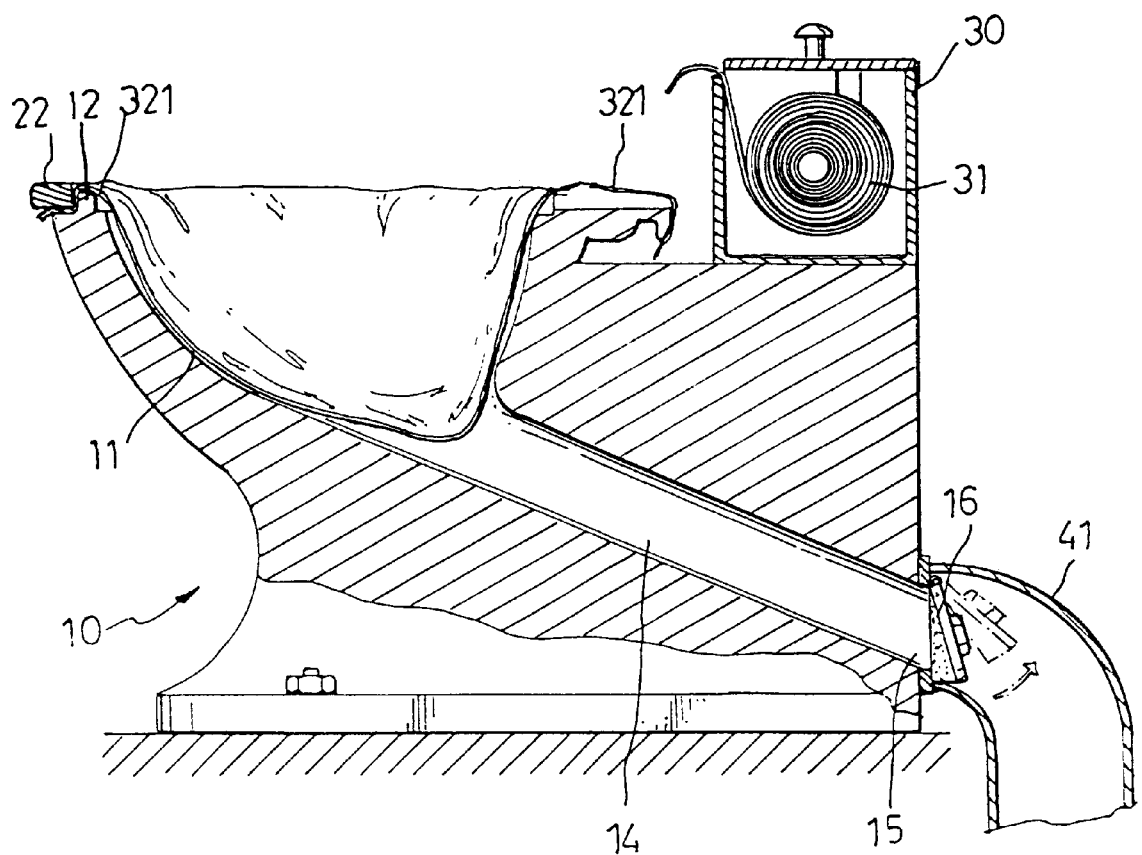
FIG. 2 is a sectional view of the toilet bowl according to the present invention, showing the clamping ring closed, a poly bag suspended in the cavity.

Referring to FIGS. 1 and 2, a dry type toilet system in accordance with the present invention comprises a toilet bowl 10. The toilet bowl 10 comprises a cavity 11, a rim 12 around the cavity 11 at the top, a coupling groove 121 around the rim 12, a block 13 raised from a rear side thereof, a clamping ring 20 which has two parallel lugs 21 outwardly raised from the periphery and bilaterally pivoted to the block 13 and a flange 22 raised from the periphery remote from the lugs 21, a rear outlet 15 at its rear side near the bottom, a passage way 14 downwardly extended from the cavity 11 to the outlet 15, and an one-way valve 16 mounted in the outlet 15 for permitting waste matter to pass out of the passage way 14 through the outlet 15.

A box 30 is provided adjacent to the toilet bowl 10 to hold a poly bag roll 31. When using the dry type toilet system, an individual poly bag 32 is separated from the poly bag roll 31, and then suspended from the rim 12 in the cavity 11, permitting the edge 321 of the open side of the poly bag 32 to be secured to the rim 12 by closing the clamping ring 20 on the coupling groove 121. After the bowels have been emptied, the clamping ring 20 is lifted from the coupling groove 121, permitting the poly bag 32 with the collected waste matter to fall to the passage way 14. The passage way 14 downwardly extends from the cavity 11 to the outlet 15 at an angle preferably approximate to 90°, so that used poly bag 32 with waste matter can be guided out of the cavity 11 to the outlet 15.

Figure 3:
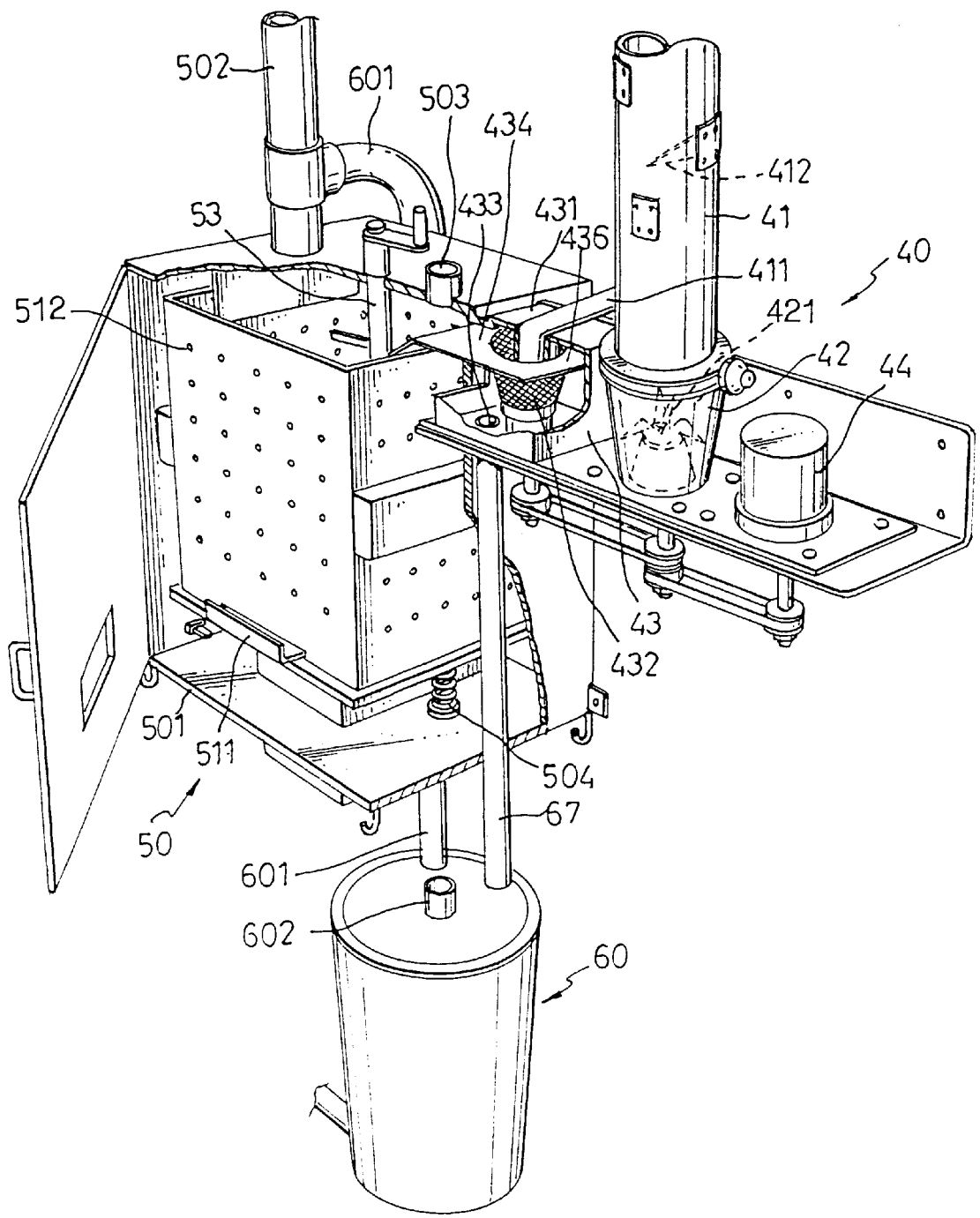
FIG. 3 is a cutaway view of the dry type toilet system according to the present invention (the toilet bowl excluded).
Figure 4A:
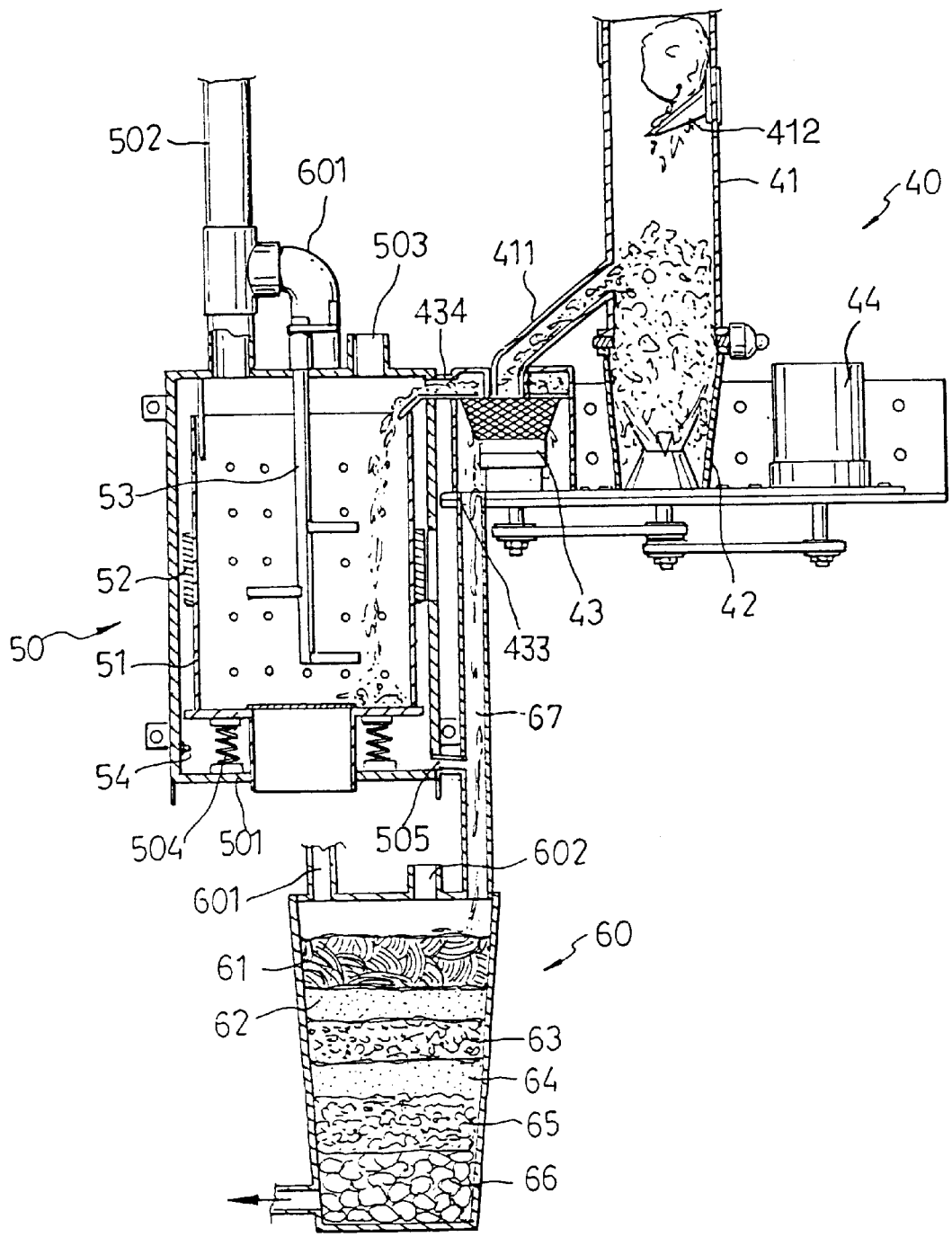
FIG. 4A is a sectional view of the dry type toilet system according to the present invention (the toilet bowl excluded).
Figure 4B:
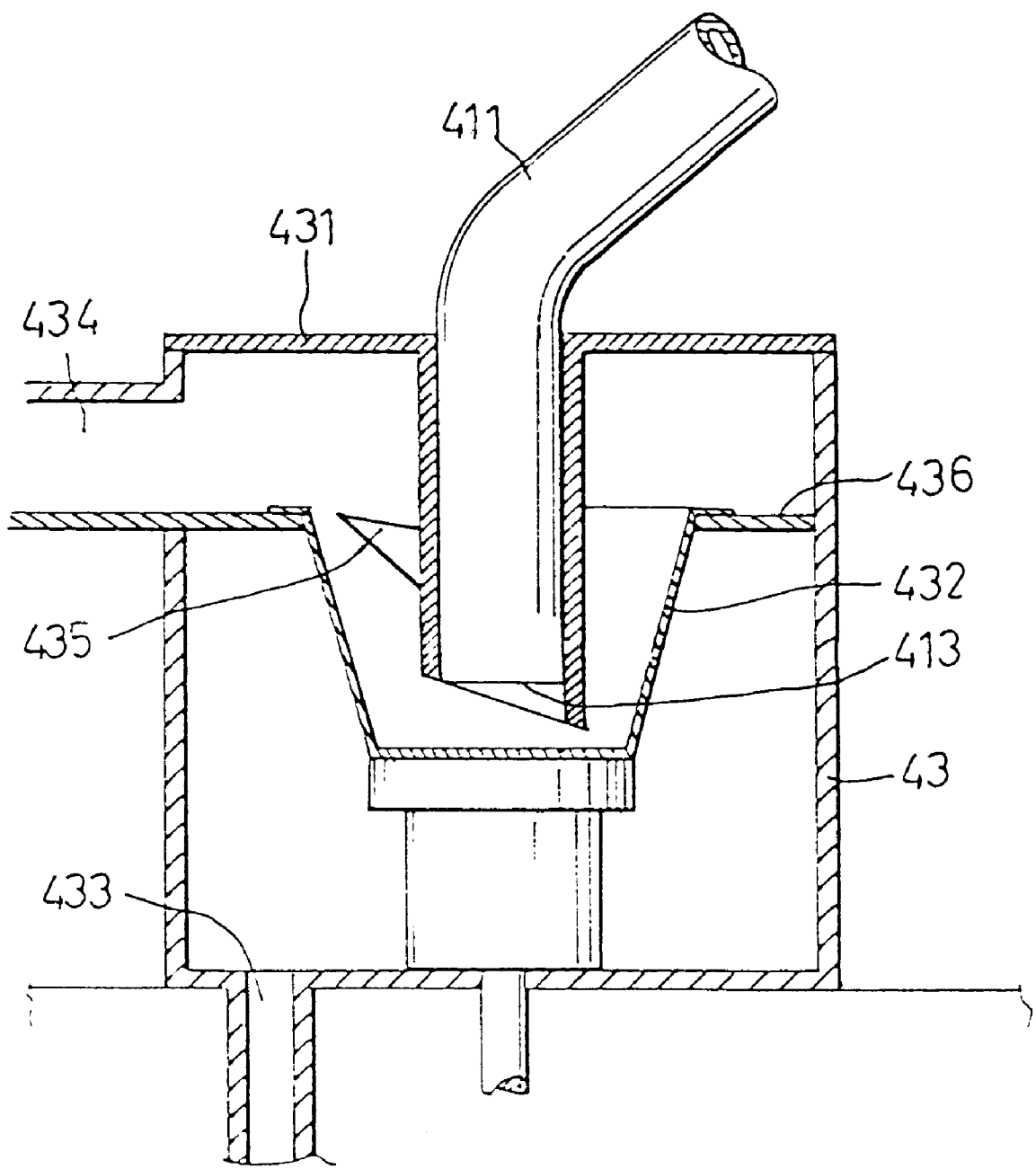
FIG. 4B is a sectional view in an enlarged view of a part of the dry type toilet system according to the present invention, showing the internal structure of the separating chamber.

Referring to FIGS. 3, 4A and 4B and FIG. 2 again, the dry type toilet system further comprises a crushing and separating unit 40, a storage unit 50, and a filter tank 60.

The crushing and separating unit 40 comprises a guide pipe 41, a crushing chamber 42, a separating chamber 43, and a motor 44. The guide pipe 41 is connected to the outlet 15 to receive waste matter from the bowl 10. Inside the crushing chamber 42, there is provided at least one reamer 421 for crushing waste matter. An overflow pipe 411 extends from the guide tube 41 at one side, and is adapted to guide crushed waste matter to the separating chamber 43. The separating chamber 43 comprises a cover 431, a strainer 432, a bottom outlet 433, and a side passage way 434. A scraper 435 is mounted on the cover 431 inside the separating chamber 43. The strainer 432 is revolvably supported on partition boards 436 inside the separating chamber 43. The outlet 413 of the overflow pipe 411 extends to the inside of the strainer 432. The bottom outlet 433 of the separating chamber 43 is connected to the filter tank 60. The side passage way 434 of the separating chamber 43 is connected to the storage unit 50. The motor 44 is controlled to turn the reamer 421 and the strainer 432.

Referring to FIGS. 3 and 4A again, the storage unit 50 comprises a storage tank 51, a dryer 52, a manual mixing element 53, and a sensor 54. A plurality of spring elements 504 are mounted on the bottom wall 501 of the storage unit 50 to support the storage tank 51. The dryer 52 is controlled to dry waste matter in the storage tank 51 (for example, the dryer 52 can be an electric heater controlled to produce heat for drying waste matter in the storage tank 51). The storage tank 51 has a plurality of holes 512 for ventilation and discharge of waste water. The sensor 54 is mounted inside the storage unit 50 beneath the storage tank 5. When storage waste matter in the storage tank 51 reaches a certain weight, the spring elements 504 are compressed, and the storage tank 51 is lowered to trigger the sensor 54, thereby causing the sensor 54 to produce an audio (or visual) warning signal through a buzzer (or alarm lamp), informing people to clear storage waste matter from the storage tank 51.

Referring to FIG. 4A, the filter tank 60 comprises a layer of filter cloth 61, a layer of fine filter sand 62, a layer of charcoal 63, a layer of coarse filter sand 64, a layer of pebbles 65, and a layer of stones 66.

Figure 5:
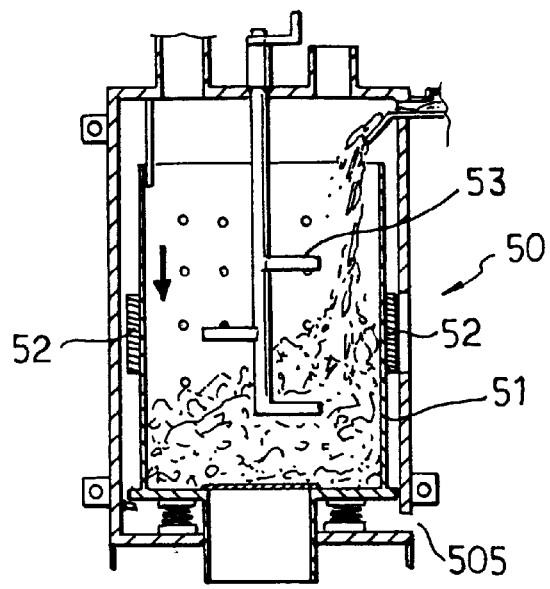
FIG. 5 is a sectional view of the storage unit of the dry type toilet system according to the present invention.
Figure 6:
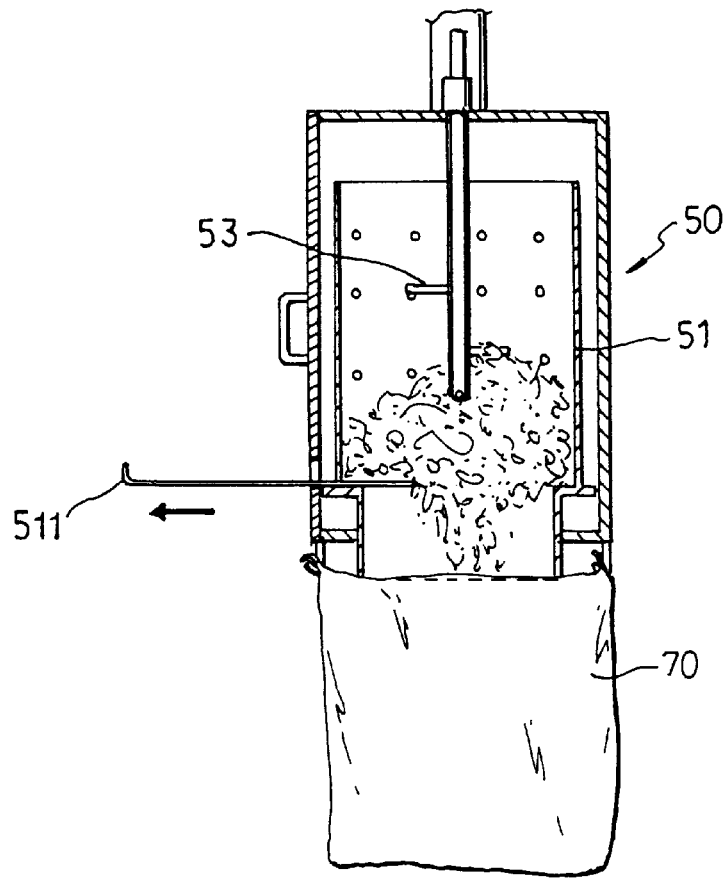
FIG. 6 is another sectional view of the storage unit of the dry type toilet system according to the present invention, showing the bottom gate opened.

Referring to FIGS. 5 and 6 and FIGS. 4A and 4B again, when a waste matter collected poly bag 32 passes through the guide pipe 41 to the crushing chamber 42, it is cut open by cutters 412 in the guide pipe 41, and then reamed into pieces. When accumulated reamed waste matter reaches a certain amount, it flows over the overflow pipe 411 to the strainer 432 in the separating chamber 43. Waste liquid from waste matter carried in the strainer 432 flows out of the strainer 432 to the filter tank 60 through the bottom outlet 433 of the separating chamber 43 and a drain pipe 67, then filtered through the filter tank 60, and then carried away from the filter tank 60 to the external environment. Because the strainer 432 is turned by the motor 44 relative to the scraper 435, solid (or semi-solid) waste matter (including crushed tissue and poly bag pieces) is thrown out of the strainer 432 to the side passage way 434 by a centrifugal force, and then collected in the storage tank 51 inside the storage unit 50 (see FIGS. 4A and 4B). The dryer 52 is then operated to dry solid waste matter collected in the storage tank 51. Well dried solid waste matter can then be used as organic fertilizer. Further, the storage tank 51 has a bottom gate 511. When the bottom gate 511 is opened, dried solid waste matter can then be taken out of the storage tank 51 and packed in a bag 70. Before removing dried solid waste matter from the storage tank 51, the manual mixing element 53 is operated to mix dried solid waste matter into powder.

Referring to FIG. 4A again, the storage unit 50 comprises an exhaust pipe 502 at the top for exhaust of bad smell, and a short air intake pipe 602 for input of fresh air. The filter tank 60 comprises an exhaust pipe 601 connected to the exhaust pipe 502 on the storage unit 50 for output of bad smell, and a short air intake pipe 503 for input of fresh air. The storage unit 50 further comprises a drain port 505 at the bottom connected to the drain pipe 67 for output of waste water to the filter tank 60.

While only one embodiment of the present invention has been shown and described, it will be understood that various modifications and changes could be made thereunto without departing from the spirit and scope of the invention disclosed.

What the invention claimed is:

1. A dry type toilet system comprising a toilet bowl, said toilet bowl comprising a cavity, a rim raised from a top side thereof around said cavity, and a bottom passage way extended from said cavity, wherein a clamping ring is pivoted to said toilet bowl and adapted for clamping around said rim to hold a poly bag in said cavity in an open status for collecting waste matter discharged from a person sitting on said toilet bowl, and wherein said clamping ring is released for permitting used poly bag with collected waste matter to fall out of said toilet bowl through said bottom passage way.

2. The dry type toilet system of claim 1, wherein said clamping ring has two parallel lugs bilaterally pivoted to a block raised from a rear side of said toilet bowl; said bottom passage way has a bottom end terminating in an outlet mounted with an one-way valve, said one-way valve allowing waste matter to pass from said bottom passage way to the outside of said toilet bowl.

3. The dry type toilet system of claim 1 further comprising a crushing a separating unit connected to the bottom outlet of said bottom passage way of said toilet bowl, and controlled to treat waster matter received from said bottom passage way of said toilet bowl, said crushing and separating unit comprising a guide pipe connected to the bottom outlet of said bottom passage way of said toilet bowl, a crushing chamber adapted to crush waste matter received from said toilet bowl through said guide pipe, a separating chamber connected to said crushing chamber adapted to separate waste water from solid waste matter crushed, and a motor controlled to turn mechanisms in said crushing chamber and said separating chamber.

4. The dry type toilet system of claim 3, wherein said crushing chamber comprises at least one reamer turned by said motor to ream waste matter collected from said toilet bowl; said separating chamber comprising a cover, a strainer revolvably supported on partition boards inside said separating chamber and turned around an overflow pipe extended from said guide pipe to strain crushed waste matter received from said crushing chamber, scraper means suspended from said cover and adapted to remove waste matter from said strainer, a bottom outlet for output of waste water separated from said strainer, and a side passage way for output of solid waste matter separated form said strainer.

5. The dry type toilet system of claim 4 further comprising a filter tank connected to the bottom outlet of said separating chamber and adapted to filter waste water, and a storage unit connected to said side passage way of said separating chamber and adapted to collect solid waste matter.

6. The dry type toilet system of claim 5, wherein said storage unit comprises a storage tank adapted to collect solid waste matter from said separating chamber, a dryer controlled to dry solid waste matter collected in said storage tank, a manual mixing element operated to mix solid waste matter in said storage tank, and sensor means adapted to detect the amount of solid waste matter accumulated in said storage tank and to produce a warning signal when accumulated solid waste matter reaches a predetermined amount.

* * * * *